United States Patent [19]

Reynolds

[11] Patent Number: 4,898,121

[45] Date of Patent: Feb. 6, 1990

[54] PORTABLE WORKING CHUTE SYSTEM

[76] Inventor: Charles E. Reynolds, P.O. Box 186, Moorcroft, Wyo. 82721

[21] Appl. No.: 229,652

[22] Filed: Aug. 8, 1988

[51] Int. Cl.$^4$ ............................................. A01K 29/00
[52] U.S. Cl. ..................................... 119/98; 119/155; 119/82
[58] Field of Search ..................... 119/15.5 R, 15.5 A, 119/82, 98, 155

[56] References Cited

U.S. PATENT DOCUMENTS

| | | | |
|---|---|---|---|
| 3,194,213 | 7/1965 | Soukup | 119/98 |
| 3,538,889 | 11/1970 | Keller | 119/82 |
| 3,538,890 | 11/1970 | Torell | 119/98 |
| 4,027,629 | 6/1977 | Pearson | 119/98 |
| 4,275,685 | 6/1981 | Hopkins | 119/155 |
| 4,366,775 | 1/1983 | Tyquin | 119/82 |

FOREIGN PATENT DOCUMENTS

| | | | |
|---|---|---|---|
| 247284 | 10/1963 | Australia | 119/98 |
| 292428 | 10/1966 | Australia | 119/82 |
| 2611801 | 9/1988 | France | 119/155 |

Primary Examiner—John Weiss
Attorney, Agent, or Firm—Dean P. Edmundson

[57] ABSTRACT

Portable working chute system which is self-contained and can be transported to any desired location and assembled without tools. The system includes an elongated working platform, wheels for supporting the platform for transport, a passageway extending over the length of the platform, a tub pen attached to one end of the platform, and legs which can be raised and lowered, as needed. The system can be used for working animals of various sizes and also for loading animals into a truck or trailer.

17 Claims, 12 Drawing Sheets

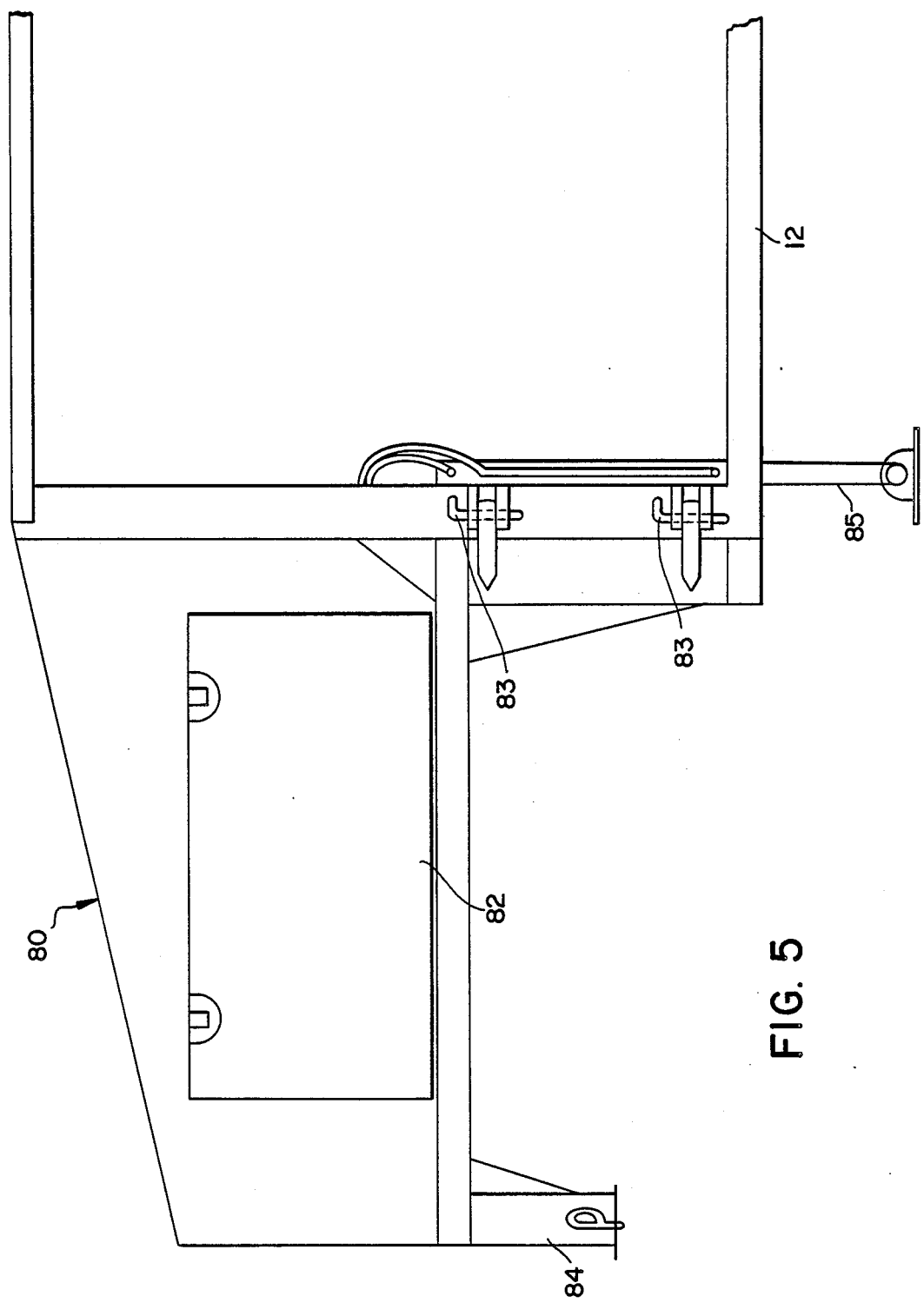

PORTABLE WORKING CHUTE SYSTEM

FIELD OF THE INVENTION

This invention relates to systems and techniques for confining animals in order to doctor the animals, apply ear tags or identification tags, or otherwise work the animals. More particularly, this invention relates to portable working chute systems and apparatus.

BACKGROUND OF THE INVENTION

Oftentimes a rancher or farmer has animals at a remote location away from all corrals or buildings. For example, it is common to lease land, either from the government or from private parties, on which animals are grazed for months at a time.

Problems are presented when it is necessary to doctor the animals, or apply identification tags, or brand the animals, etc. at locations away from working corrals. Although animals can be roped and tied in order to enable them to be doctored, branded, etc., this is a very slow and time consuming process when an entire herd must be worked. Also, this can result in injury to either the animal or the workers, or both.

It is sometimes possible to drive the herd to a set of permanent working corrals, but normally this is not a viable alternative because of large distances involved. Furthermore, the cost of building a set of working corrals may be uneconomical or prohibitive.

Although portable corral systems have been proposed, there has not heretofore been provided a portable fully self-contained working chute system which is easily set up and efficient for the intended use. Furthermore, prior systems have not included a working platform for the workers or the ability to transport fence panels as a part of the system. Also, prior systems have not included any ability to transport horses or to load animals into a truck or trailer.

SUMMARY OF THE PRESENT INVENTION

In accordance with the present invention there is provided a portable working chute system which can be readily and easily transported to any desired remote location and then set up for use in confining and working animals (e.g., cattle). In one embodiment the chute system comprises:

(a) an elongated platform having first and second ends;
(b) wheels adapted to support the platform for transport and which are movable to enable the platform to rest on the ground;
(c) upright members attached to the platform and forming a passageway extending longitudinally over the platform;
(d) a tub pen attached to the second end of the platform, the tub pen comprising (i) a frame member, (ii) a plurality of upright support members attached to the frame member, (iii) a plurality of curved panel sections detachably secured to the support members and forming a tub pen having an inlet opening and an outlet opening, wherein the outlet opening communicates with the passageway; and (iv) at least one gate pivotably attached to the frame member and being adapted to pivot within the tub pen; wherein the tub pen is adapted to be disassembled and carried on the platform for transport; and (e) leg members attached to the platform which are adapted to selectively raise and lower the first end of the platform.

After the portable chute system has been transported to the desired area for use it is lowered to the ground and the tub pen is set up. Portable panels or fence sections carried on the platform are set up and connected in the desired manner to confine the animals and direct them into the tub pen. No tools are required for setting up or assembling the apparatus.

Then the animals can be directed or urged into the elongated passageway where they are doctored, treated, or otherwise worked. The platform provides a working surface for the workers so that they do not have to stand in mud, dirt, snow, etc. The animals can then be simply released or they may be loaded into trailers or trucks for transport. By raising one end of the platform the system can be used as a loading ramp to load the animals into a trailer or truck for transport.

Other advantages of the portable working chute system of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 5 is a side elevational view of the front portion of a preferred embodiment of hitch which is useful in this invention;

DETAILED DESCRIPTION OF THE INVENTION

Figure 1:
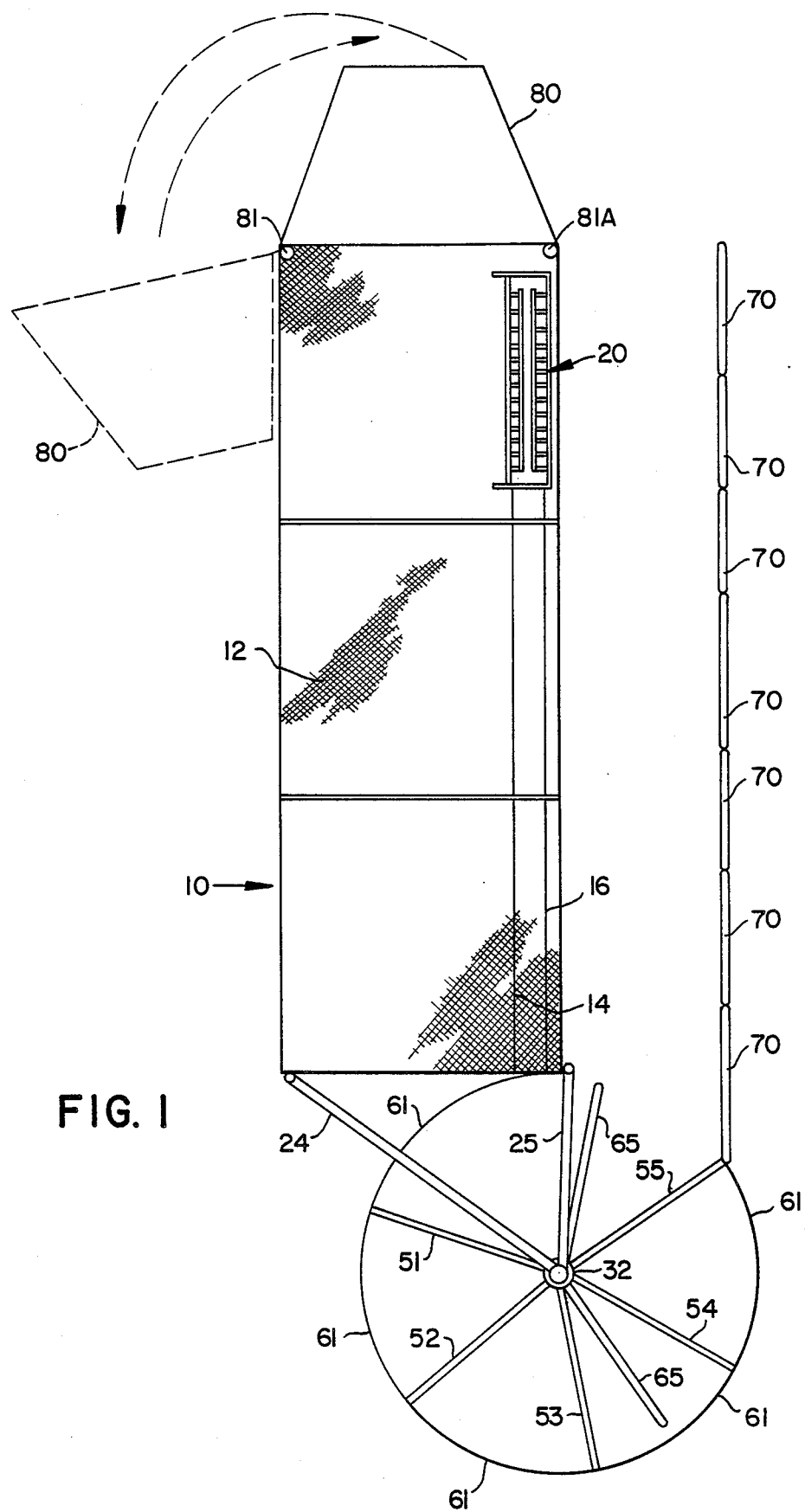
FIG. 1 is a top view of one embodiment of portable working chute system of the invention.
Figure 1A:
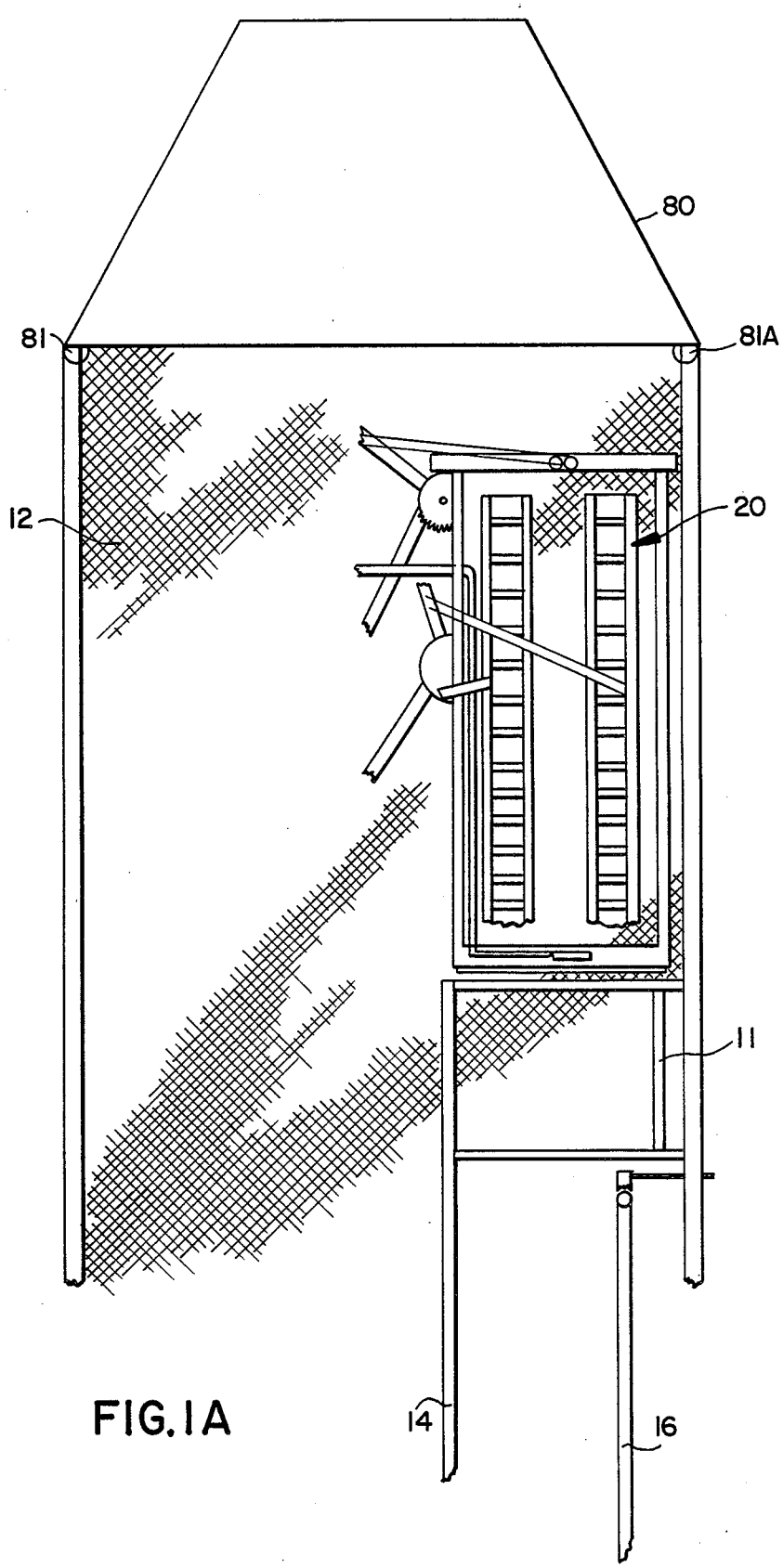
FIG. 1A is a top view illustrating the squeeze chute on the platform.

In FIG. 1 there is shown a top view of a preferred embodiment of portable working chute system 10 of the invention. The system includes an elongated platform 12 which has a generally planar upper surface. The width of the platform is preferably about 8 feet to provide a good working surface and yet allow transport on the highway. The length of the platform can vary, for example, from about 20 to 40 feet, with 32 feet being preferred.

Upright members or panels 14 and 16 are supported on the upper surface of the platform and form an elongated passageway extending along the length of the platform. A conventional squeeze chute 20 is preferably secured to the platform in longitudinal alignment with the passageway, as illustrated. Any type of squeeze chute desired may be used.

Figure 3:
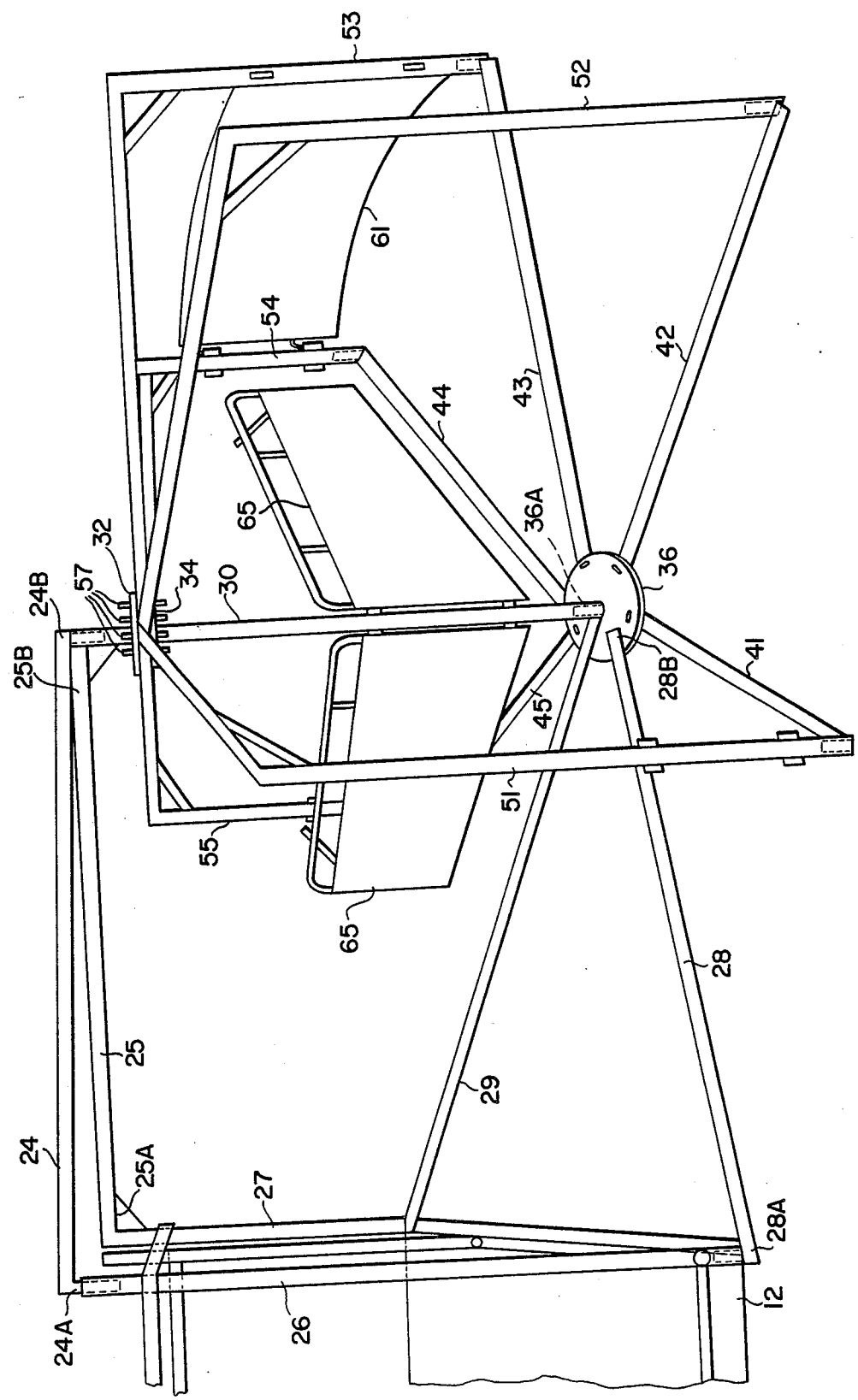
FIG. 3 is a perspective view illustrating the manner in which the tub pen is attached to one end of the platform.
Figure 4:
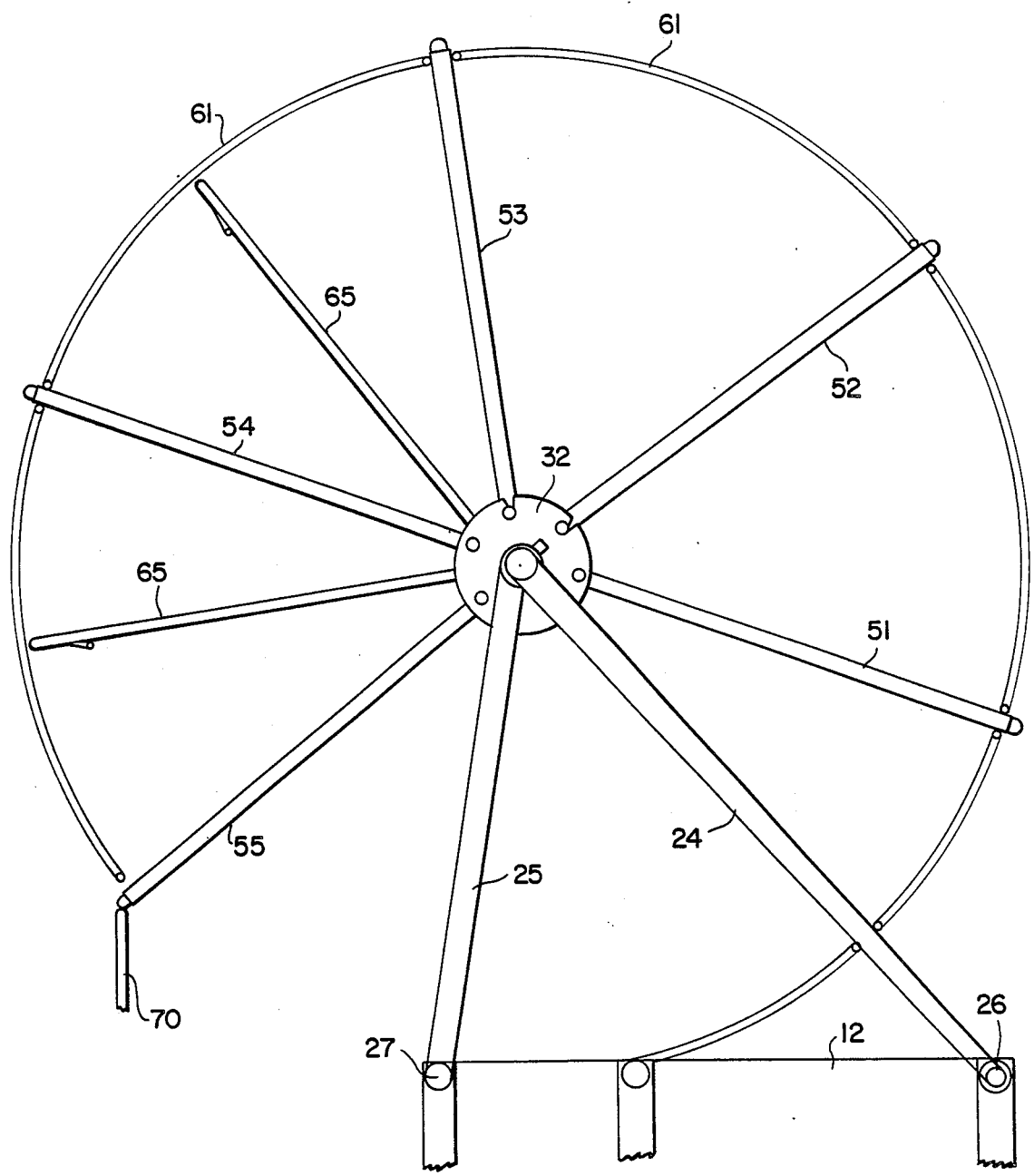
FIG. 4 is a top view illustrating the framework for the tub pen.

A round or tub pen is detachably secured to one end of the platform. The tub pen includes upper and lower frame sections which are attached at one end to the platform and at their opposite end to an upright post which is spaced from the platform and which serves as the center post of the tub pen. The tub pen is also illustrated in FIGS. 3 and 4.

Upper frame section 24 includes a downwardly projecting finger at each end. End 24A is slidably inserted into the upper end of upright post 26 secured to platform 12. End 24B is detachably connected to the upper end of upright post 30.

End 25A of frame section 25 is pivotably secured to the upper end of upright post 27 carried by platform 12. End 25B of frame section 25 is welded to the upper end of post 30.

Lower frame section 28 includes an upwardly projecting finger at end 28A which is slidably inserted into the lower end of post 26, as illustrated. End 28B is welded or secured to circular plate 36. A vertical or upstanding peg or finger 36A at the center of plate 36 is slidably received in the lower end of post 30, as illustrated.

Lower frame section 29 is pivotably secured to the lower end of post 27. The opposite end of section 29 is welded to the lower end of post 30.

Circular plate 34 is supported in a horizontal plane near the upper end of post 30. For example, it may be welded to the post 30. Around the periphery of plate 34 are a plurality of apertures.

Circular plate 32 has an opening through its center so that the plate loosely engages the post 30. Plate 32 can slide vertically on post 30 and can also rotate. Plate 32 also includes a plurality of apertures around its periphery.

Figure 4A:
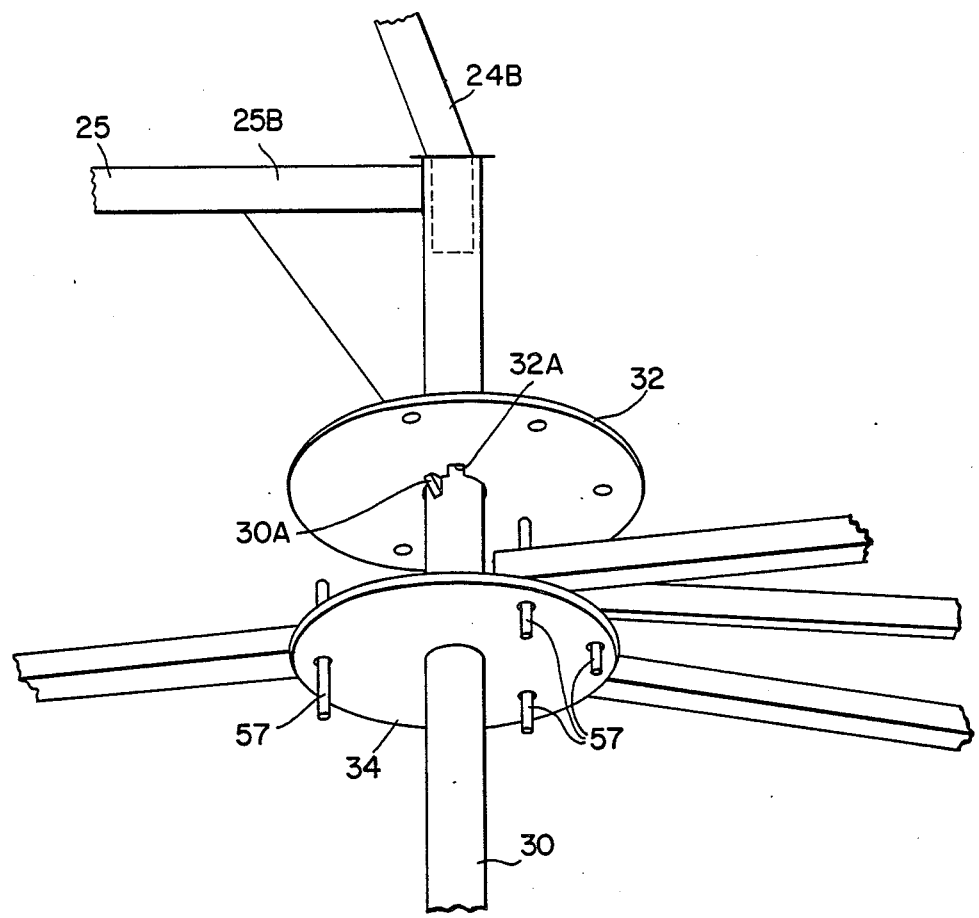
FIG. 4A is a perspective view illustrating a preferred manner in which the frame assembly for the tub pen is connected to the center post.

As illustrated in FIG. 4A, the plate 32 includes a notch 32A. Post 30 includes a peg or catch member 30A. When notch 32A of plate 32 is aligned with peg 30A, plate 32 can be slid upwardly and then rotated slightly so that peg 30A prevents the plate from sliding downwardly. This maintains plate 32 at a spaced distance from plate 34 during the assembly process, as explained later.

Lower frame sections 41, 42, 43, 44, and 45 have upwardly projecting fingers at each end thereof. At the inner end of each frame section the upstanding finger slidably engages an aperture in the periphery of circular plate 36.

L-shaped upright support members 51, 52, 53, 54 and 55 are connected to the outer ends of each frame section 41–45, respectively. The upstanding finger on each frame section slidably engages the lower end of a respective upright support, as illustrated in FIG. 3.

As illustrated in the drawings, the upright support members radiate outwardly from the post 30. The inner end of each support member 51–55 is detachably secured between plates 32 and 34 by means of a pin 57 which is secured to the inner end of a support member in a manner such that a portion of the pin extends above the support and a portion of the pin extends below the support. For example, the pin may extend through a vertical opening in the support where it is welded in place. Then the lower end of the pin is inserted into a respective opening in the lower plate 34. After each pin 57 in support members 51–55 has been inserted into a respective aperture in plate 34, then plate 32 is rotated in a manner such that it may be slid downwardly on post 30 and aligned with the upper ends of the pins 57. Plate 32 then slides downwardly over the pins 57 to complete the assembly.

Between adjacent upright support members 51–55 there is connected a curved panel or wall section 61. Only one such panel is illustrated in FIG. 3 (between upright supports 53 and 54), but in actual operation there are additional panels secured between all other upright support members in a manner such that a circular tub pen is formed having an inlet for animals and an outlet into the passageway at the end of the platform.

At least one, and preferably two, gates 65 are pivotably attached to the upright post 30 in a manner such that the gates can pivot freely around post 30 within the tub pen. This enables the gates to be used to urge animals around the tub pen and into the passageway on the platform where they can be treated or worked.

Preferably the diameter of the tub pen is at least 16 feet, and more preferably 20 feet. If desired, the diameter may be as large as 24 feet.

Preferably a plurality of fence or panel sections 70 are connected in end-to-end fashion to form a confinement fence leading to an inlet to the tub pen. This is illustrated in FIG. 1. For example, the fence sections can be set up in a manner such that they form a fence generally parallel to the platform.

The components of the tub pen and the confinement fence can be disassembled and stored on the platform for transport. For example, the components can be set on the platform in upright parallel fashion and then the components on the outside edge are detachably secured for transport.

The frame sections 25 and 29, and post 30, are not detached from the platform 12 for transport. Rather, they are pivoted about post 27 in a manner such that they are positioned along one side of the platform and are then secured for transport. Gates 65 on post 30 may also remain attached for transport so long as they are secured along the side of the platform.

FIG. 1 also illustrates a preferred feature of the system of the invention. The hitch portion of the system is preferably a gooseneck member 80 which is pivotably connected at each side 81 and 81A so that it can be pivoted to either side of platform 12 as desired, when the system is being used to work animals.

Figure 6:
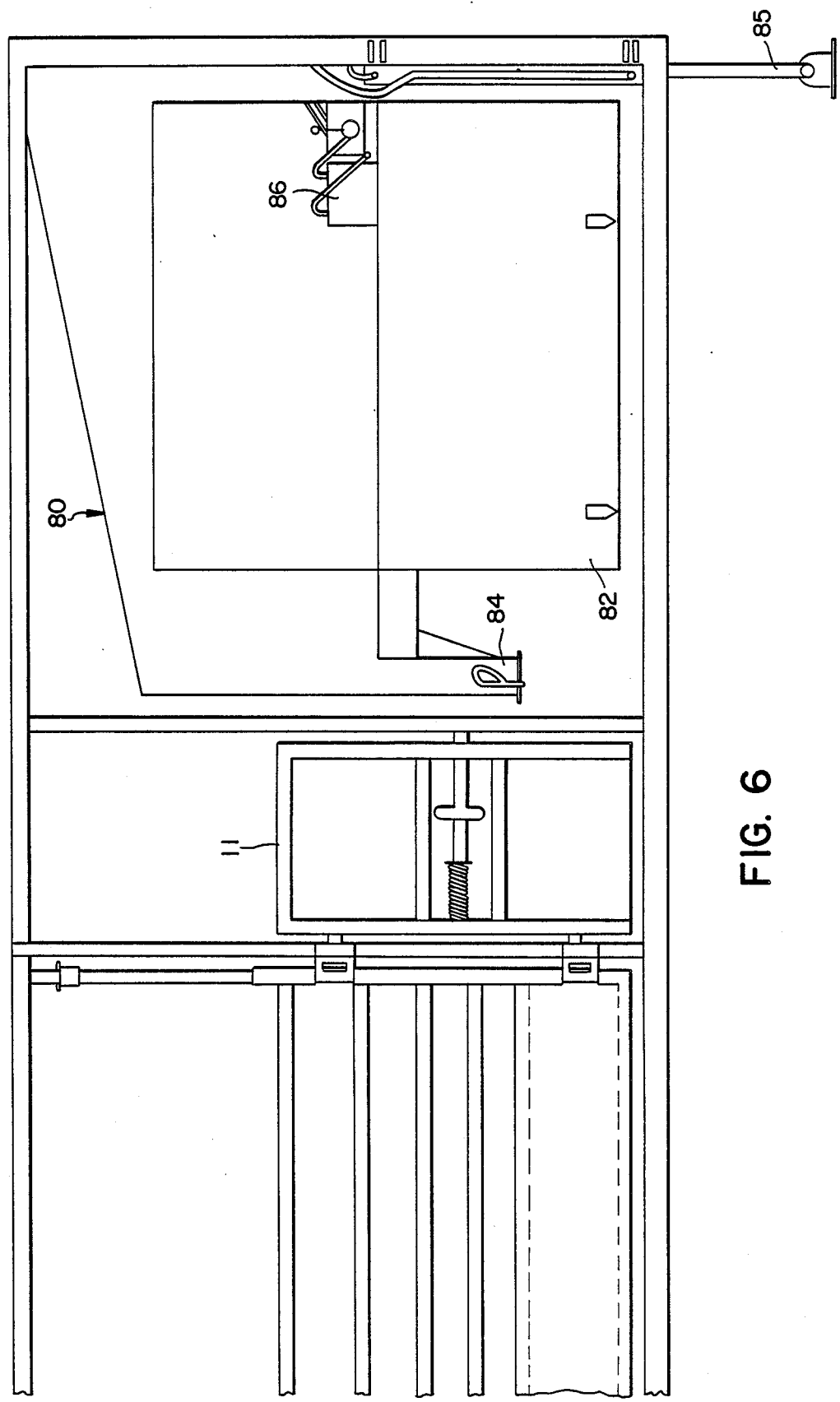
FIG. 6 is a side elevational view illustrating the hitch of FIG. 5 pivoted to a position adjacent the side of the platform.
Figure 7:
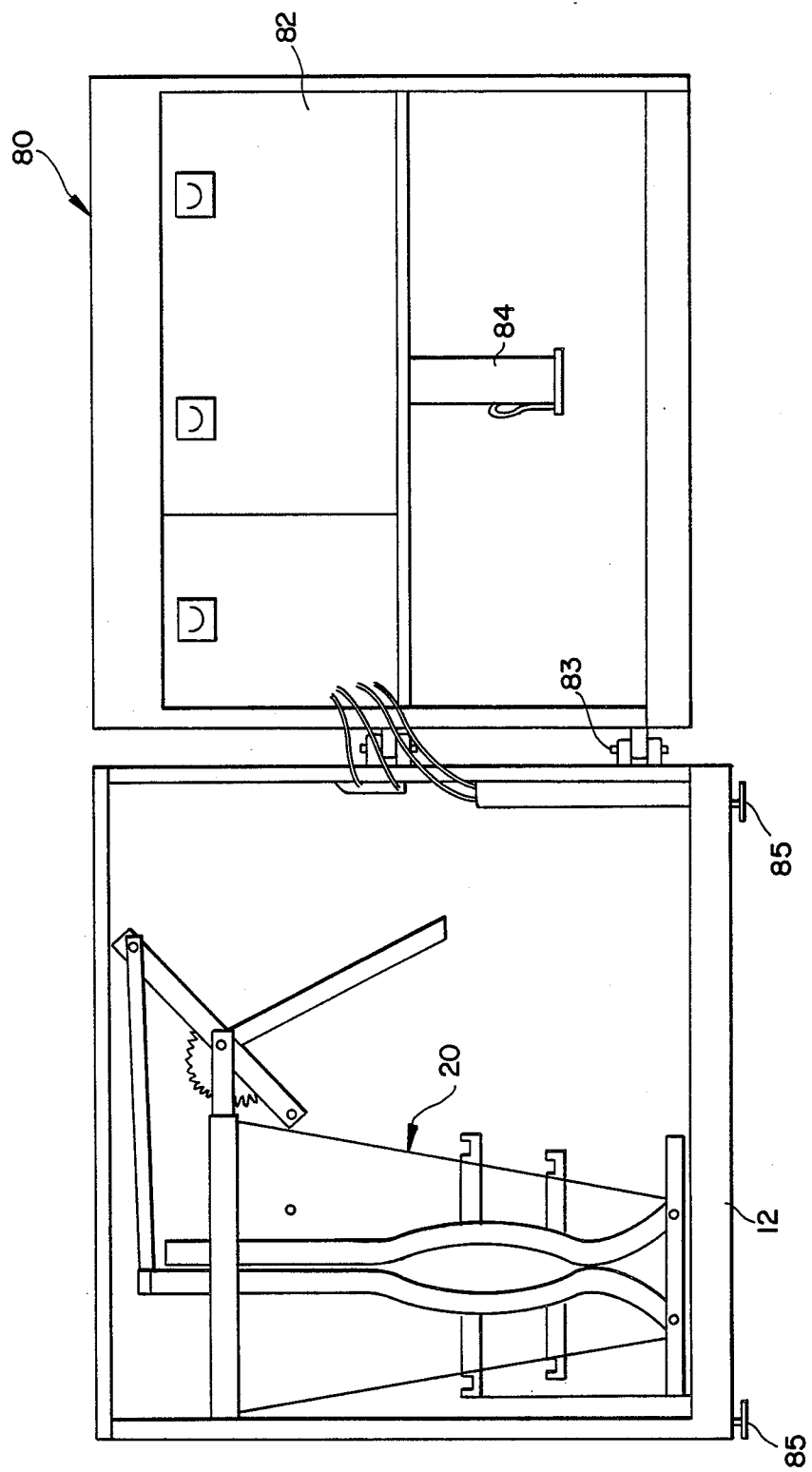
FIG. 7 is an end view of the embodiment shown in FIG. 1 with the hitch portion pivoted away from the platform.

More preferably the member 80 includes a housing or enclosure (also illustrated in FIGS. 5 and 6) having access door 82. When the member 80 is pivoted to the side of the platform the door 82 may be opened to allow access to medicines, tools, equipment, etc. which may be stored within the housing. Access can be made to such contents by a person working on the platform 12. This provides a shelf also. This is extremely convenient and efficient. Preferably the door 82 is hinged along its lower edge so that the door pivots downwardly when opened, as illustrated in FIG. 6. Locks may be included to lock door 82, if desired.

Each side of the gooseneck member 80 is pivotably connected to the uprights on the platform by means of removable pins 83. When the pins are removed from one side the gooseneck can be pivoted toward the opposite side.

Hitch 84 enables connection to a truck for transport of the portable working chute system to any desired location. Hydraulically controlled legs 85 at the leading end of the platform can raise or lower this end of the platform, as needed.

Figure 8:
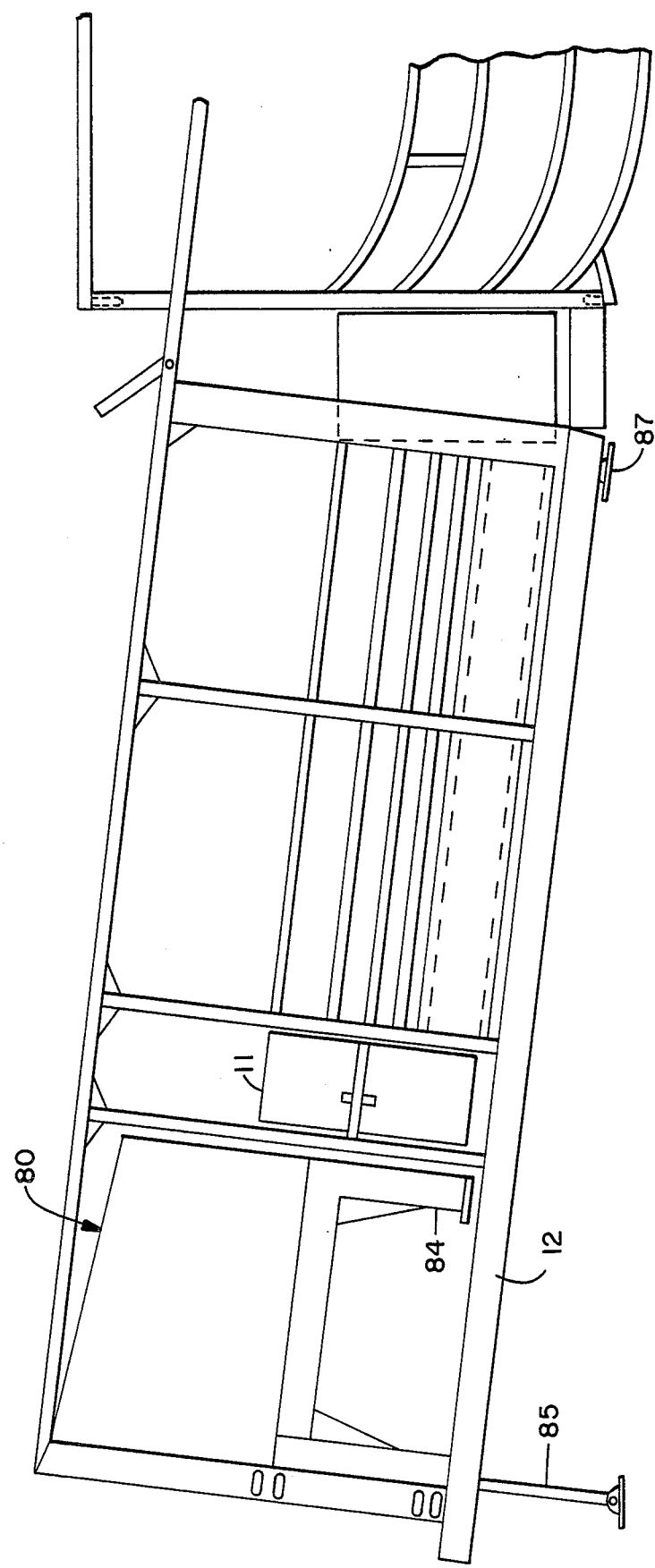
FIG. 8 is a side elevational view illustrating the use of the portable system as a loading chute.

FIG. 8 illustrates the portable system being used as a loading chute or platform, e.g., to load animals onto a truck or trailer for transport. The end of the platform away from the tub pen is raised to the desired level by legs 85. The end adjacent the tub pen remains on the ground (legs 87 are retracted). The animals may be urged through the round pen, through the passageway on the platform, and into the transport vehicle. No separate ramp or loading chute is required.

The platform is preferably raised and lowered by means of hydraulic jacks carried by each corner of the platform. The control and operation of the hydraulic system is preferably by means of electrical power (e..g, 12 Volt D.C. battery). The controls 86 (shown in FIG. 6) may be contained within the gooseneck housing, if desired.

Figure 9:
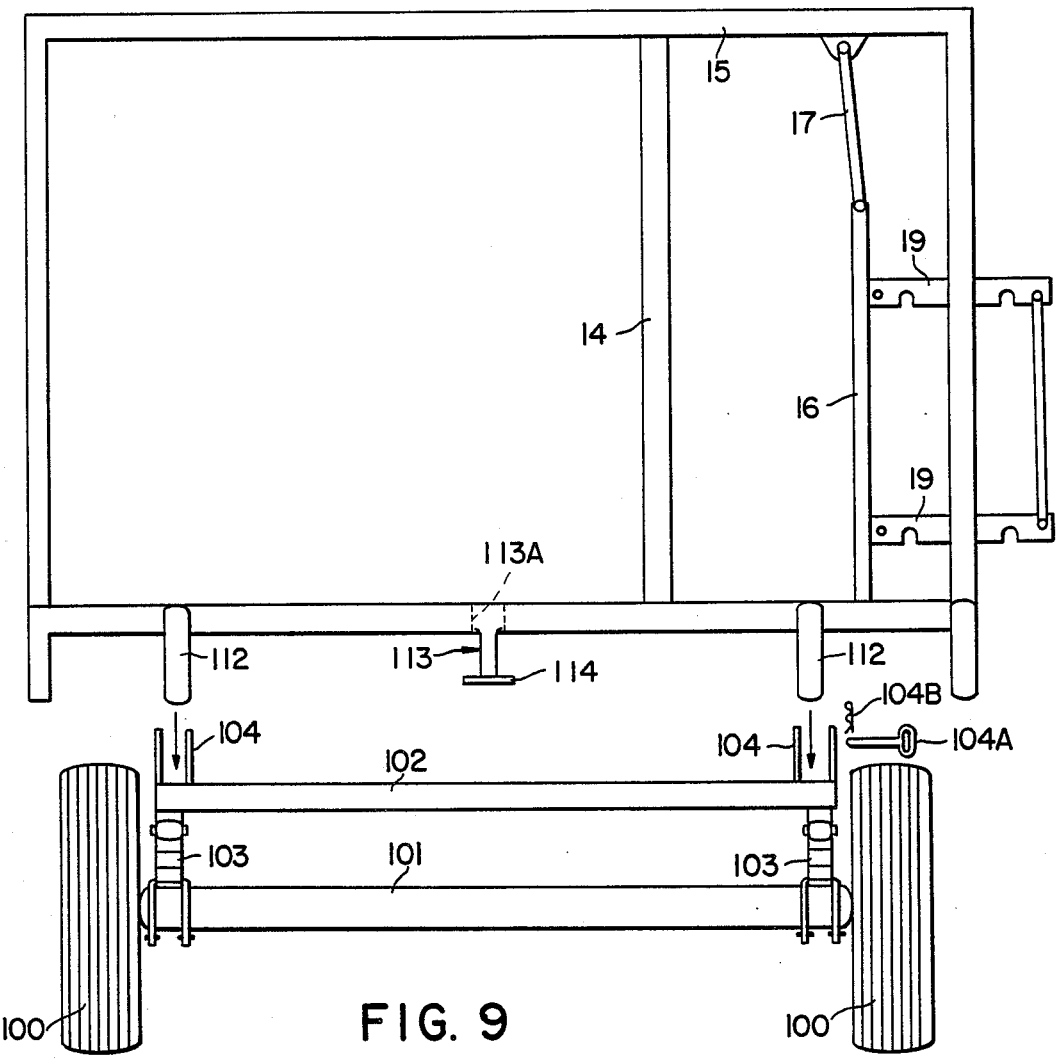
FIG. 9 is an end view of one embodiment of transport wheel system which is useful in this invention.
Figure 10:
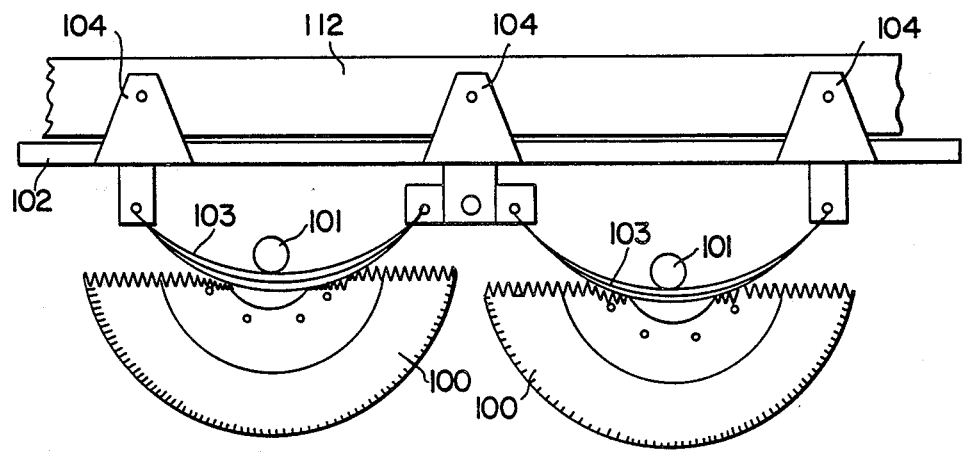
FIGS. 10 and 11 are side and top views, respectively, of the transport wheel system shown in FIG. 9.
Figure 11:
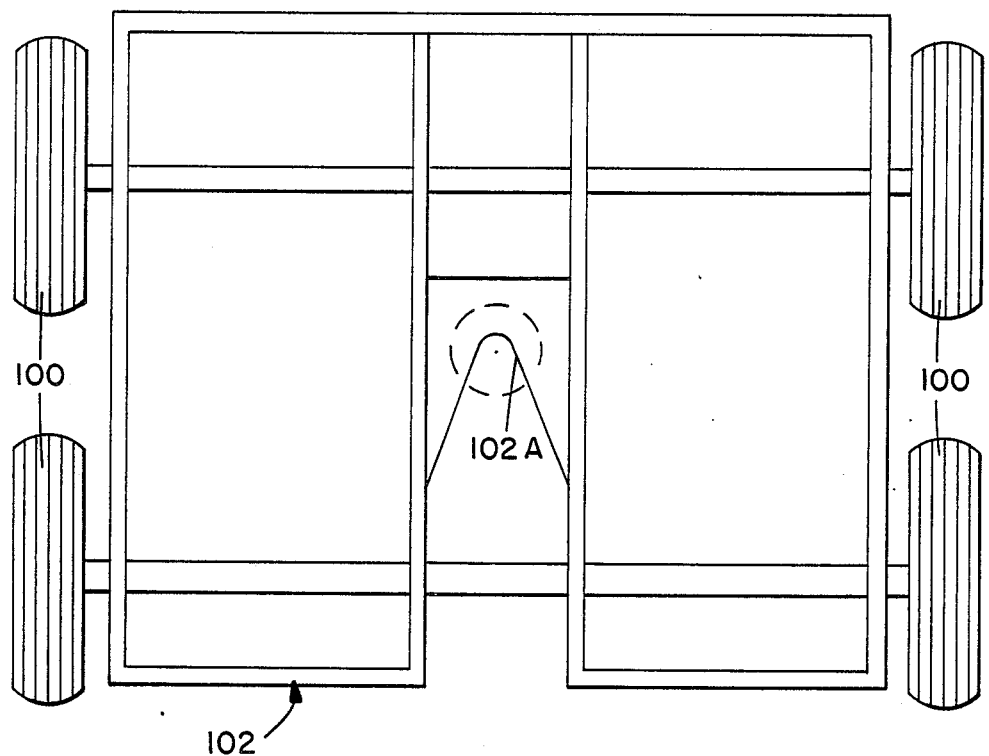

FIGS. 9, 10 and 11 illustrate a preferred embodiment of removable wheel system used in this invention. There are shown wheels 100 mounted on axles 101 of sub-frame or carriage 102. Springs 103 are connected between axles 101 and carriage 102.

Carriage 102 includes upstanding connection members 104 on each side thereof. Each connection member includes an opening therethrough. The connection members are adapted to align with and connect to frame sections 112 under platform 12. Removable pins 104A are inserted through registering openings in each frame section 112 and connection member 104. A clip 104B then holds pin 104A in place.

Also carried by frame 12 is a pin member 113 having a circular plate 114 secured to its lower end. Pin 113 is slidingly received in aperture 113A in frame 12. Pin 113 is adapted to engage notch 102A in carriage 102 when the frame 12 is lowered over carriage 102 and the carriage is moved slightly in a length-wise direction.

When the hydraulic jacks are urged downwardly in order to raise the platform, and after pins 104A are removed, the carriage 102 may be moved out from under the platform 12. Then the platform can be lowered to the ground for working operation. To ready the platform for transport the jacks are again lowered to raise the platform. Then the carriage is rolled under and connected to the frame 112.

Figure 2:
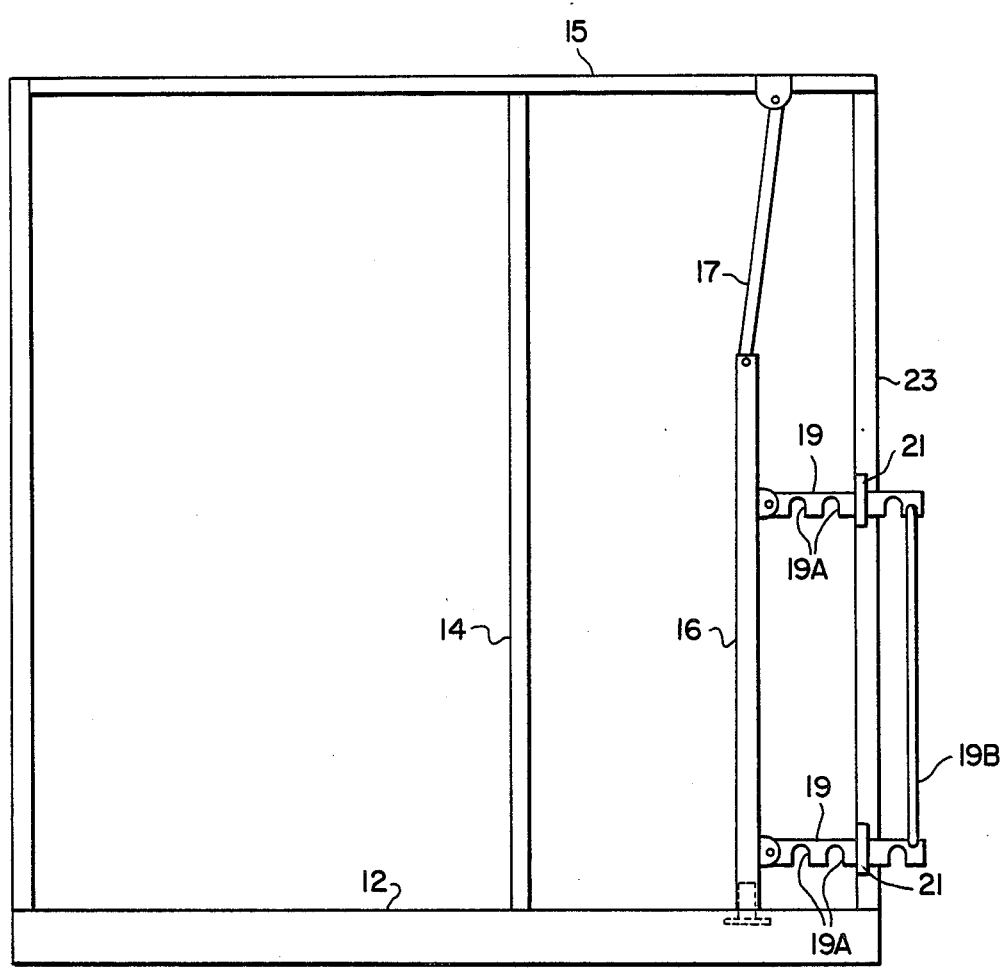
FIG. 2 is an end view of the apparatus shown in FIG. 1, illustrating one manner in which the width of the passageway or alley can be adjusted.

FIG. 2 is an end view illustrating one manner in which the width of the passageway on the platform can be adjusted. One side 14 of the passageway is normally fixed, and side 16 is adapted to be moved laterally closer to or further away from side 14.

Side 16 comprises a panel which is supported or suspended in vertical fashion from cross member 15. For example, panel 16 may be suspended from arm 17 in a manner such that the panel can be moved inwardly and outwardly to adjust the width of the passageway. The upper end of arm 17 is pivotally attached to frame member 15 while the lower end is pivotally attached to the upper edge of panel 16. Horizontal arms 19 are pivotally attached to panel 16 at two positions. Panel 16 may be temporarily secured in desired position by means of latch arms 19 having notches 19A on the lower edge. The notches are adapted to engage catch members 21 on upright support 23. Handle 19B is connected to the outer ends of the arms 19 so that both arms can be worked simultaneously.

When it is desired to change the width of the passageway the handle 19B is raised. This frees the arms 19 from the catches 21 so that the arms (and panel 16) can move horizontally. Then the arms 19 are permitted to move downwardly so that a notch in each arm 19 again engages the catch 21. It is often necessary to adjust the width of the passageway in order to accommodate animals of different sizes (e.g. cows, calves, bulls, yearlings, etc.).

Other variations are possible in the system of the invention. For example, one or more of the panels 14 and 16 of the passageway may be detachably mounted so as to permit them to be removed, if desired. Also, a small access gate 11 may be included behind the squeeze chute. The gate 11 is hinged at one side to enable the gate to be pivoted outwardly to permit access to the back end of the squeeze chute.

As another variation, the wheels under the platform may be hinged or pivoted to the underside of the platform. The wheels may then be moved between raised and lowered positions hydraulically or mechanically, as desired, without removing the wheels from the platform.

The system of this invention provides a wide working platform or surface for the workers. When the upper surface of the platform comprises a mesh or grate it is self-cleaning and is not slippery.

The system of this invention also is fully self-contained, includes a complete set of portable working corrals, and can be assembled or disassembled without the use of separate tools. It is also possible to transport horses on the platform by confining them in the passageway during travel.

Other variants are possible without departing from the scope of this invention.

What is claimed is:

1. Portable working chute system comprising:
    (a) an elongated platform having first and second ends; said platform providing a working surface;
    (b) wheels adapted to support said platform for transport;
    (c) upright members attached to said platform and forming a passageway extending longitudinally over said platform;
    (d) a tub pen attached to said second end of said platform, said tub pen comprising (i) a frame member, (ii) a plurality of upright support members attached to said frame member, (iii) a plurality of curved panel sections detachably secured to said support members and forming a tub pen having an inlet opening and an outlet opening, wherein said outlet opening communicates with said passageway; and (iv) at least one gate pivotably attached to said frame member and being adapted to pivot within said tub pen; wherein said tub pen is adapted to be disassembled and carried on said platform for transport;
    (e) leg members attached to said platform which are adapted to selectively raise and lower said first end of said platform; and
    (f) a gooseneck hitch member pivotably attached to said first end of said platform; wherein said hitch member is pivotable between (i) a towing position in which said hitch member is longitudinally aligned with said platform, and (ii) a resting position in which said hitch member is pivoted to one side of said platform.

2. A chute system in accordance with claim 1, wherein said wheels are carried by a carriage which is adapted to be detachably connected to said platform.

3. A chute system in accordance with claim 1, wherein one of said upright members is movable in a manner such that the width of said passageway between said upright members may be varied.

4. A chute system in accordance with claim 1, wherein said hitch member comprises an enclosure having an access opening therein, wherein said access opening faces said platform when said hitch member is in said resting position, wherein said access opening includes a door.

5. A chute system in accordance with claim 1, further comprising a squeeze chute secured to said platform and in alignment with said passageway.

6. A chute system in accordance with claim 1, further comprising a hydraulic system which is adapted to selectively raise and lower said leg members.

7. A chute system in accordance with claim 3, wherein one of said upright members includes arms which are adapted to lock said upright member in a fixed position relative to the other said upright member.

8. Portable working chute system comprising:
   (a) an elongated platform having first and second ends; said platform providing a working surface;
   (b) wheels adapted to support said platform for transport;
   (c) first and second parallel upright members attached to said platform and forming a passageway extending longitudinally over said platform; wherein said first upright member is movable in a manner such that the width of said passageway between said upright members may be varied;
   (d) a tub pen attached to said second end of said platform, said tub pen comprising (i) a frame member, (ii) a plurality of upright support members attached to said frame member, (iii) a plurality of curved panel sections detachably secured to said support members and forming a tub pen having an inlet opening and an outlet opening, wherein said outlet opening communicates with said passageway; and (iv) at least one gate pivotably attached to said frame member and being adapted to pivot within said tub pen; wherein said tub pen is adapted to be disassembled and carried on said platform for transport;
   (e) leg members attached to said platform which are adapted to selectively raise and lower said first end of said platform; and
   (f) a gooseneck hitch member pivotably attached to said first end of said platform; wherein said hitch member is pivotable between (i) a towing position in which said hitch member is longitudinally aligned with said platform, and (ii) a resting position in which said hitch member is pivoted to one side of said platform.

9. A chute system in accordance with claim 8, wherein said hitch member comprises an enclosure having an access opening therein, wherein said access opening faces said platform when said hitch member is in said resting position, wherein said access opening includes a door.

10. A chute system in accordance with claim 8, wherein said wheels are carried by a truck which is adapted to be detachably connected to said platform.

11. A chute system in accordance with claim 8, wherein a squeeze chute secured to said platform and in alignment with said passageway; and wherein a hydraulic system which is adapted to selectively raise and lower said leg members.

12. A chute system in accordance with claim 8, wherein said first upright member comprises an elevated support and a panel section pivotably suspended from said elevated support; wherein said panel section includes arms which are adapted to lock said panel section in a fixed position relative to said second upright member.

13. A chute system in accordance with claim 8, further comprising a plurality of confinement panels adapted to be connected in an end-to-end manner, wherein one of said panels is adapted to be detachably connected to said tub pen adjacent said inlet opening.

14. Portable working chute system comprising:
   (a) an elongated platform having first and second ends; said platform providing a working surface;
   (b) wheels adapted to support said platform for transport;
   (c) first and second parallel upright members attached to said platform and forming a passageway extending longitudinally over said platform; wherein said first upright member is movable in a manner such that the width of said passageway between said upright members may be varied;
   (d) a tub pen attached to said second end of said platform, said tub pen comprising (i) a frame member, (ii) a plurality of upright support members attached to said frame member, (iii) a plurality of curved panel sections detachably secured to said support members and forming a tub pen having an inlet opening and an outlet opening, wherein said outlet opening communicates with said passageway; and (iv) at least one gate pivotably attached to said frame member and being adapted to pivot within said tub pen; wherein said tub pen is adapted to be disassembled and carried on said platform for transport;
   (e) leg members attached to said platform which are adapted to selectively raise and lower said first end of said platform; and
   (f) gooseneck hitch member pivotably attached to said first end of said platform; wherein said hitch member is pivotable between (1) a towing position in which said hitch member is longitudinally aligned with said platform, and (2) a resting position in which said hitch member is pivoted to one side of said platform.

15. A chute system in accordance with claim 14, wherein said wheels are carried by a truck which is adapted to be detachably connected to said platform.

16. A chute system in accordance with claim 14, wherein said hitch member comprises an enclosure having an access opening therein, wherein said access opening faces said platform when said hitch member is in said resting position, wherein said access opening includes a door.

17. A chute system in accordance with claim 14, further comprising a hydraulic system which is adapted to selectively raise and lower said leg members.

* * * * *